United States Patent [19]

Iida

[11] Patent Number: 4,680,707
[45] Date of Patent: Jul. 14, 1987

[54] ELECTRONIC CASH REGISTER AND METHOD FOR DEFINING PRINT CHARACTERS

[75] Inventor: Yuji Iida, Shizuoka, Japan

[73] Assignee: Tokyo Electric Co., Ltd., Tokyo, Japan

[21] Appl. No.: 695,449

[22] Filed: Jan. 28, 1985

[30] Foreign Application Priority Data

Feb. 6, 1984 [JP] Japan .................. 59-19791

[51] Int. Cl.$^4$ .................. G07G 1/12; G06F 15/22
[52] U.S. Cl. .................. 364/405; 340/750; 400/121
[58] Field of Search .................. 364/405, 200, 900; 340/730, 731, 748, 751, 750; 400/70, 65, 121

[56] References Cited

U.S. PATENT DOCUMENTS

| 3,893,558 | 7/1975 | Fulton et al. | 400/124 |
| 3,921,135 | 9/1975 | Komaru et al. | 340/750 X |
| 3,921,164 | 11/1975 | Anderson | 340/750 X |
| 3,928,845 | 12/1975 | Clark | 340/750 X |
| 4,020,465 | 4/1977 | Cochran et al. | 364/900 |
| 4,143,360 | 3/1979 | Bernhart et al. | 364/518 X |
| 4,386,265 | 5/1983 | Sugimori | 235/3 |
| 4,409,591 | 10/1983 | Simkovitz | 340/731 |
| 4,553,222 | 11/1985 | Kurland et al. | 364/900 |
| 4,573,812 | 3/1986 | Kondo | 400/121 |

FOREIGN PATENT DOCUMENTS

| 0110174 | 9/1981 | Japan | 364/405 |
| 2067806 | 7/1981 | United Kingdom . | |
| 2058424 | 8/1981 | United Kingdom . | |
| 2089547 | 6/1982 | United Kingdom . | |
| 2109972 | 8/1983 | United Kingdom . | |

OTHER PUBLICATIONS

Osborne Executive Guides, vol. 1, pp. 81-90, Osborne Computer Corp., 1983.

Primary Examiner—Jerry Smith
Assistant Examiner—Charles B. Meyer
Attorney, Agent, or Firm—Frishauf, Holtz, Goodman & Woodward

[57] ABSTRACT

There is an electronic cash register comprising a keyboard having numeral keys and first to fourth function keys, a first memory in which a plurality of character codes and a plurality of corresponding character patterns have been stored, and a data processing unit which generates sales data in response to the key operations in the keyboard and also reads out the character pattern from the first memory in accordance with the sales data and supplies it to a dot printer in the registration mode. In the program mode, the data processing unit stores the character code which is generated by operating the numeral keys and first function key into a second memory and stores the column address data which is generated by operating the numeral keys and second function key and the character pattern formed of the dot pattern which is generated by operating the numeral keys and third function key into the second memory. The data processing unit also transfer the character pattern stored in the second memory (in response to the operation of the fourth function key) into the memory area in the first memory that is designated by the character code stored in the second memory.

15 Claims, 14 Drawing Figures

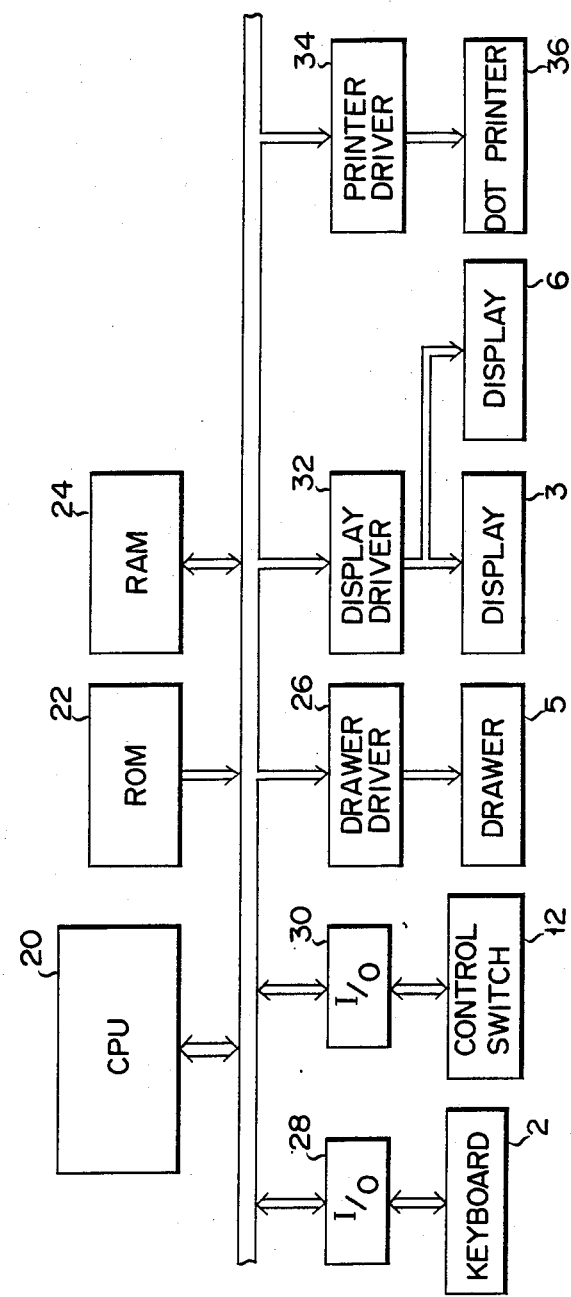

ELECTRONIC CASH REGISTER AND METHOD FOR DEFINING PRINT CHARACTERS

BACKGROUND OF THE INVENTION

The present invention relates to an electronic cash register which prints character patterns such as sales data, trade names of sales goods and the like on a receipt and issues the receipt.

Recently, electronic cash registers have come into being which use a dot printer which can print formal character patterns of sales data on a receipt and also can print commercial characters, trade names, department names, and the like of which the contents can be changed on the receipt. In such electronic cash registers a read only memory (ROM), having character dot pattern memory areas for storing a plurality of character pattern data, each of which is represented by a dot matrix, and their character codes is used. In the case of printing characters such as messages or the like on a receipt by operating keys of a predetermined combination of numeral keys, department keys and function keys on the keyboard for every character using the character codes corresponding to these message characters, the message data is stored in the print memory area in a random access memory (RAM). This message data is read out upon sales registration of goods and is printed together with the sales data on a receipt by a dot printer.

The message data is ordinarily indicated by alphabets, numerals and the like. However, the amount of character patterns which can be stored in the dot pattern memory area in the RAM is limited, so it is difficult to store all of the necessary character data in this dot pattern memory area. For instance, it is impossible to print special characters such as, e.g., Grecian characters or the like other than alphanumeric characters which are ordinarily used in everyday business transactions. In word processors or the like, characters which are not registered can be generally registered by sequentially writing therein, for example, dot data "1" at the position designated by the cursor while watching the display screen. However, in ordinary electronic cash registers, a display having a display screen of (a plurality of columns) ×(a plurality of dots) is not used; therefore, it is generally considered to be impossible to register new special letters by manually operating keys.

SUMMARY OF THE INVENTION

It is an object of the present invention to provide an electronic cash register which can arbitrarily set a desired character pattern by key operations.

This object is accomplished by an electronic cash register comprising: a keyboard having numeral keys, first to fourth function keys and department keys; a mode setting switch; a dot printer; a first memory for storing a plurality of character patterns representing characters and character codes to designate these characters; second and third memories; and a data processing circuit which, when the mode setting switch is set at a registration mode position, generates sales data and programs it into the second memory in accordance with the key operations on the keyboard. The data processing circuit then reads out a character pattern from the first memory in accordance with the sales data and drives the dot printer on the basis of this character pattern. When the mode setting switch is set at a program mode the data processing circuit stores, the data that is generated due to the operations of the numeral keys and first function key, into the third memory as the character code data, the column address data that is generated due to the operations of the numeral keys and second function key and the character pattern that is produced by the dot pattern data that is generated due to the operations of the numeral keys and third function key into the third memory. The data processing circuit also stores the character pattern stored in this third memory into a memory area in the first memory that is designated by the character code data stored in the third memory in response to the operation of the fourth function key.

In this invention, the column address is designated according to the operations of the numeral keys and second function key, and the dot pattern in the corresponding column address can be set according to the operations of the numeral keys and third function key, so that a character pattern can be easily set without a dot pattern display.

BRIEF DESCRIPTION OF THE DRAWINGS

FIG. 3 is a block diagram of a control circuit in the electronic cash register shown in FIG. 1;

DETAILED DESCRIPTION OF THE PREFERRED EMBODIMENT

Figure 1:
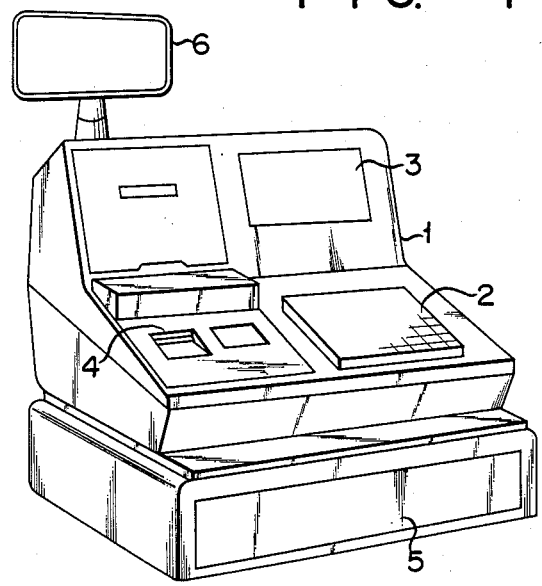
FIG. 1 is a perspective view of an electronic cash register according to one embodiment of the present invention.

FIG. 1 is a perspective view illustrating an electronic cash register according to one embodiment of the present invention. As shown in the drawing, this electronic cash register includes a casing 1; a keyboard 2 having keys for various kinds of sales registrations which is attached to the front surface of the casing 1; a display section 3, attached in an upper portion of the casing 1, for displaying department code, individual amount, total amount, etc. of sales goods; and a receipt issuing section 4 and a drawer 5 which are respectively provided in the intermediate portion and on the lower side of the casing 1. Further, a display section 6 for customers which is constituted similarly to the display section 3 is attached over the casing 1 by a supporting rod.

Figure 2:
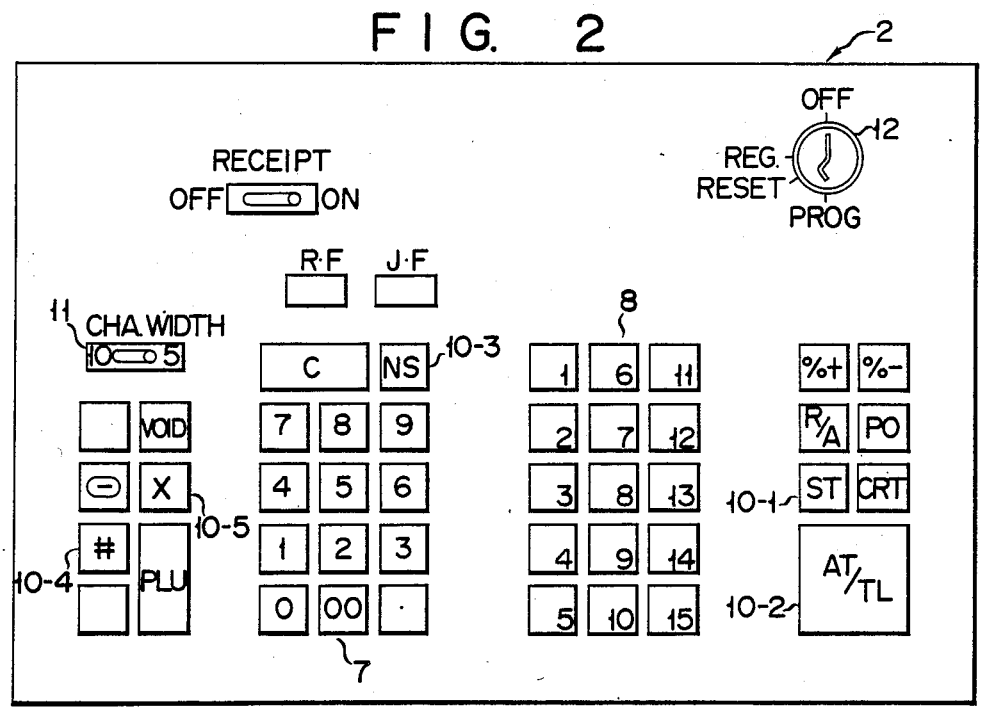
FIG. 2 shows a keyboard used in the electronic cash register shown in FIG. 1.

As shown in FIG. 2, the keyboard 2 includes numeral keys 7 to input the sales amount and number of goods; department keys 8 to indicate classification of goods; a subtotal key 10-1; an "amount tendered/total (AT/TL)" key 10-2 to calculate the total amount; and the like. This keyboard 2 is also provided with other various kinds of function keys such as a "no sale (NS)" key 10-3, a "number (#)" key 10-4, a "multiplication (X)" key 10-5, etc. The keyboard 2 is further provided with a character width selecting key 11 to preliminarily set a character width of character pattern which is to be entered according to the operation of the keys of a combination of the above-mentioned respective keys for registrations, and a control switch 12 which is operated by a key.

In the embodiment, the character width can be selected to either five often dots by the character width selecting key 11. The control switch 12 controls the turn-on and turn-off of a power supply and also gives commands for respective operations such as "registration", "reset", "program", etc. to a central processing unit to execute them. In the operation of "registration", the amounts and the like of goods sold are stored in a memory section and the total amount and the like are calculated, and the results are printed on a receipt and a recording paper. In the operation of "reset", the total sales amount and the like registered in the memory section are printed and outputted at the end of the operations in a day. Further, in the operation of "program", character patterns of the characters which are printed and outputted on the receipt are preliminarily set into a RAM, due to the combined key operations.

FIG. 3 is a block diagram of the electronic cash register shown in FIG. 1. This electronic cash register includes a CPU 20; a ROM 22 storing programs to execute the operations of "registration", "reset" and "program" and fixed data such as a first character dot pattern and the like; and a RAM 24 for storing the registration data of each good which is inputted by keys, input character pattern and the like. Further, the CPU 20 is connected through each data bus to a drawer driver 26 to open and close the drawer 5, an I/O port 28 to receive a key signal from the keyboard 2, an I/O port 30 to receive a designation signal from the control switch 12, a display driver 32 to supply a display signal to the displays 3 and 6, and a printer driver 34 to drive a dot printer 36 for printing data on a receipt.

Figure 4B:
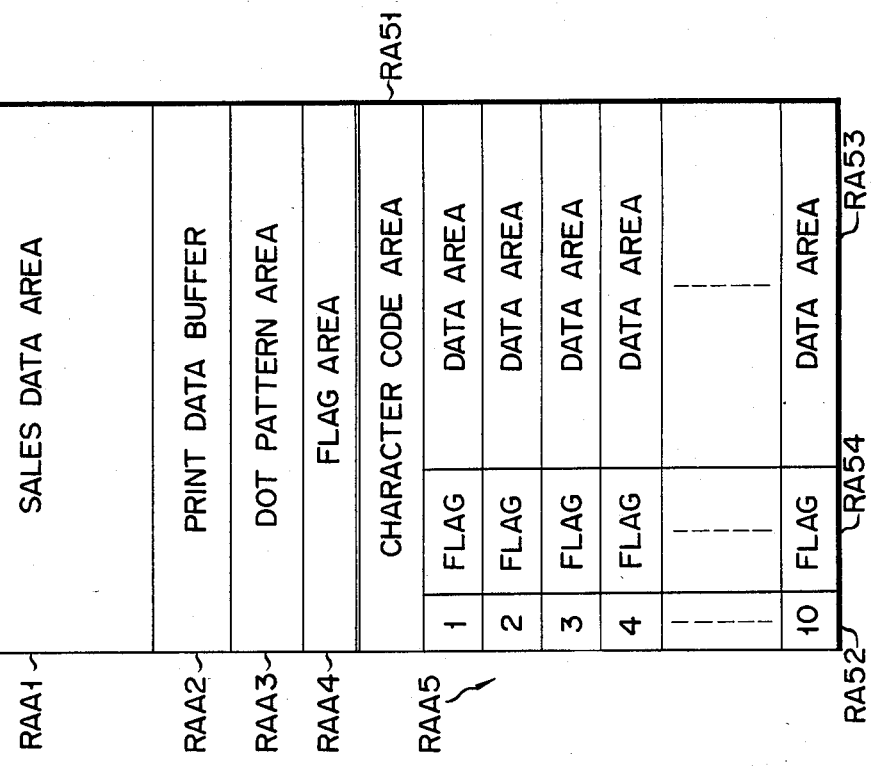
FIGS. 4A and 4B show memory maps of a ROM and a RAM respectively which are used in the control circuit shown in FIG. 3.
Figure 4A:
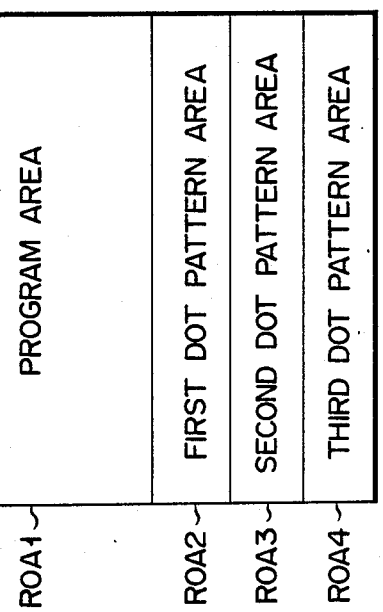

As shown in FIG. 4A, in the ROM 22, a program area ROA1 is formed to store the program of each operation, a first dot pattern area ROA2 to store character patterns of characters such as alphanumeric characters or the like which are ordinarily used as dot patterns in a matrix form, a second dot pattern area ROA3 to store character patterns such as italic characters or the like which are infrequently used, and a third dot pattern area ROA4 to store character patterns such as extended characters or the like which are likewise infrequently used. A first character dot pattern memory is constituted by those three character dot pattern areas ROA2, ROA3 and ROA4. Each character pattern stored in each of those character dot pattern areas is represented by, e.g., bit information of a dot matrix of (five columns)×(seven dots). A 7-bit dot data is converted to hexa-codes and these hexa-codes are stored as coded dot data in each column address of columns 1 to 5. A peculiar character code is added to each character pattern in the character dot pattern area ROA2.

On the other hand, as shown in FIG. 4B, in the RAM 24, there are formed a sales data area RAA1 to register the sales data inputted through the keyboard 2, a print data buffer RAA2 to temporarily store character codes of characters representing one-line data which are printed and outputted on a receipt by the dot printer 36, a dot pattern area RAA3 to store the character patterns transferred from the second or third dot pattern area ROA3 or ROA4 in the ROM 22 when the power supply is turned on or the like, a flag area RAA4 to store a CH-0N flag representing that the program operation for the character patterns is being performed due to the key operations of the keyboard 2, and a character pattern producing area RAA5 to temporarily store character pattern data of one character during the foregoing program operation.

Further, in the character pattern producing area RAA5, there are formed a character code area RA51 for storing a character code of character pattern to be entered, ten column address areas RA52 for storing column addresses "1 " to "10" of the foregoing dot matrix, data areas RA53 which are designated by the respective column addresses "1" to "10" and store the foregoing coded dot data, and flag areas RA54 for storing a DOT-ON flag indicating one of the data areas RA53 which is designated by one of the column addresses "1" to "10" and into which the coded dot data is being set.

Figure 5:
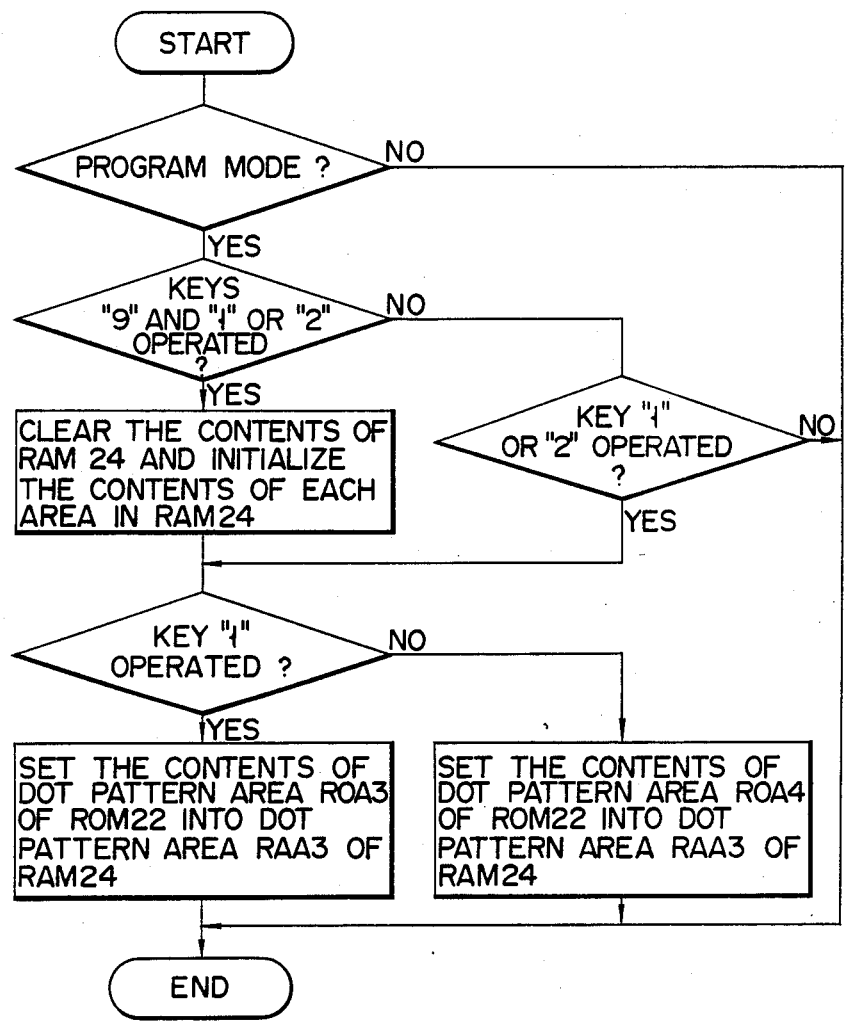
FIG. 5 is a flow chart showing the initializing operation of the control circuit shown in FIG. 3.

After the power supply is turned on, the CPU 20 executes the initialization process in accordance with a flow chart shown in FIG. 5. First, a check is made to see if the control switch 12 is set at the "program" mode position or not. When it is detected that the control switch 12 is not set at the "program" mode position, the CPU 20 finishes this initialization process. On the contrary, when it is detected that the control switch 12 is set at the "program" mode position, the CPU 20 checks to see if the numeral key "9" ) and numeral key "1" or "2" or have been operated when the power supply is turned on. If it is detected that the numeral keys "9" and "1" or keys "9" and "2" have been operated, the CPU 20 clears the contents of the RAM 24 and initializes the contents of each area in the RAM 24. Thereafter, the CPU 20 checks to see if the numeral key "1" is operated or not. On the other hand, when it is detected that the numeral keys "9" and "1" or "2" are not operated, the CPU 20 checks to see if the numeral key "1" or "2" is operated or not. If it is detected that either numeral key "1" or "2" have been operated, a check is made to see if the numeral key "1" is operated or not. If it is detected that the numeral key "1" has been operated, the CPU 20 transfers the contents of the dot pattern area ROA3 in the ROM 22 into the dot pattern area RAA3 in the RAM 24. On the other hand, if it is detected that the numeral key "1" is not operated, namely, that the operation of the numeral key "2" has been detected, the CPU 20 transfers the contents of the dot pattern area ROA4 in the ROM 22 into the dot pattern area RAA3 in the RAM 24. In this way, the contents of dot pattern area ROA3 or ROA4 are transferred into the dot pattern area RAA3, then this initialization process is finished.

Figure 6:
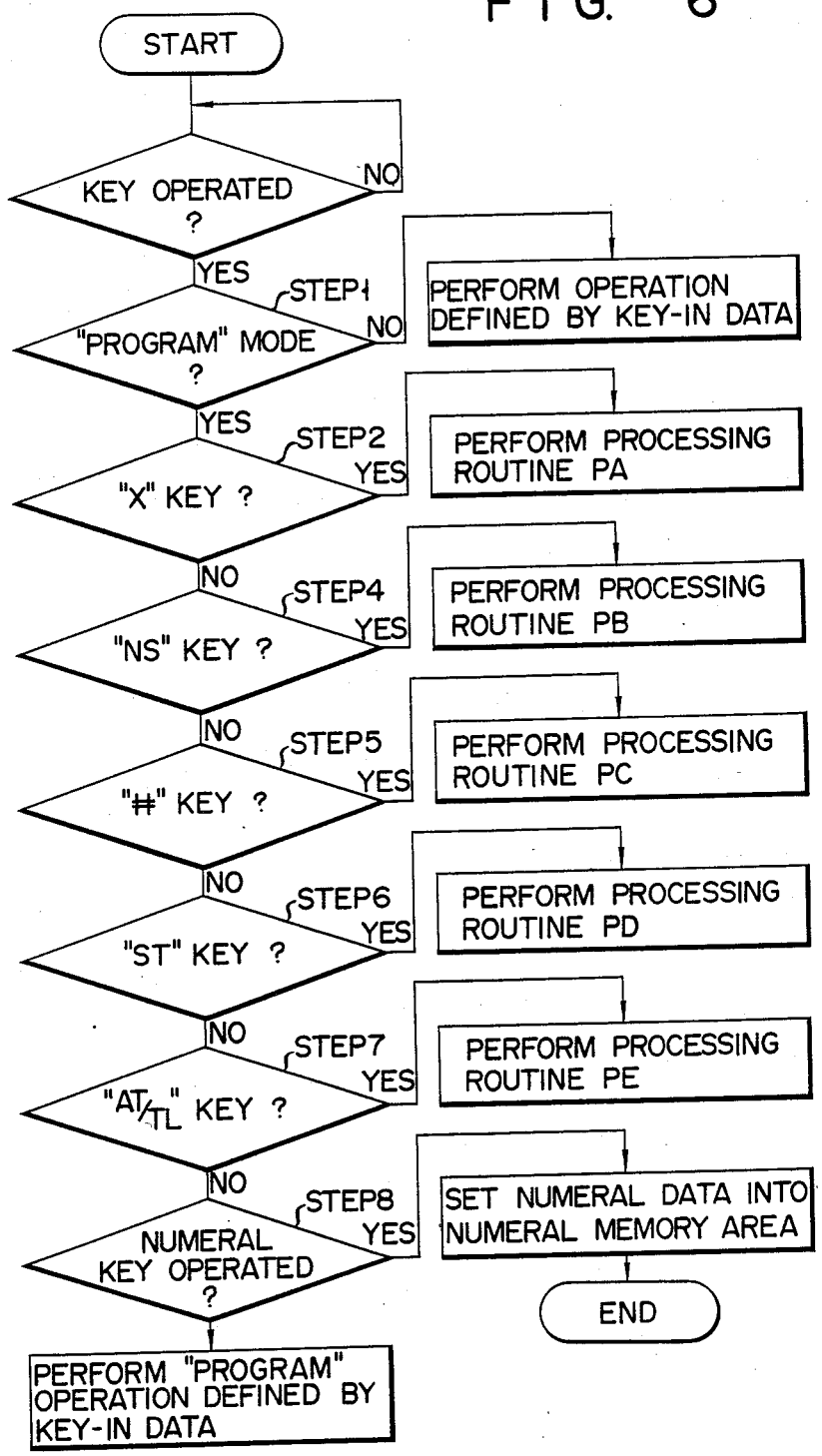
FIGS. 6, 7, 8, 9, 10 and 11 are flow charts showing the character pattern program operation.

FIG. 6 shows a flow chart to store desired character patterns in the RAM 24 by operating various keys on the keyboard 2. When the CPU 20 receives key input data, it first checks to see if the control switch 12 is set at the "program" mode position or not in STEP 1. When it is detected that the control switch 12 is not set at the "program"mode position, the CPU 20 executes the operations in accordance with the key-in data and operation mode defined by the control switch 12. In this STEP 1, when it is detected that the control switch 12 is set at the "program" mode position, the CPU 20 checks to see if the operated key is the "X" key 10-5 or not in STEP 2. In the case of the "X" key 10-5, a processing routine PA shown in FIG. 7 is executed.

Figure 7:
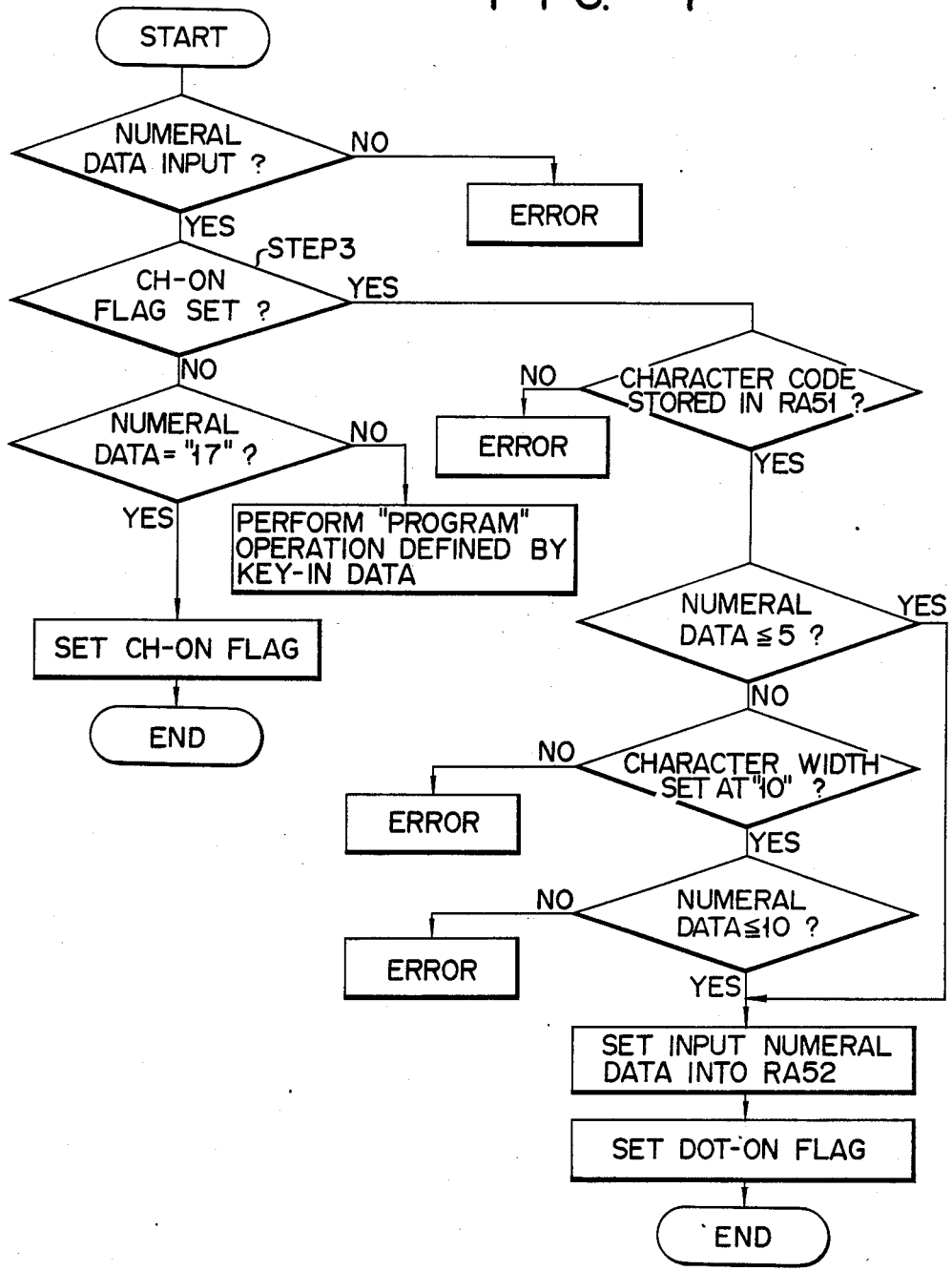

In the processing routine PA shown in FIG. 7, the CPU 1 first checks to see if at least one of the numeral keys 7 has been operated before the "X" key 10-5 is operated. If it is detected that no numeral key is operated, the CPU 20 determines that there is an error in the key operation and finishes this processing routine PA. Then the CPU 20 waits until the next key-in data is generated. On the other hand, if it is detected that at least one of the numeral keys 7 has been operated before the "X" key 10-5 is operated, the CPU 20 checks to see if the CH-ON flag is set into the flag area RAA4 or not in STEP 3. In this STEP 3, if it is detected that the CH-ON flag is reset, the CPU 20 checks to see if the input numeral data generated due to the key operation is equal to numeral data "17" indicative of the start of the character pattern program operation and thereafter it sets the CH-ON flag into the flag area RAA4 and finishes this processing routine. Then, the CPU 20 waits until the next key-in data is generated. When it is detected that the input numeral data is not "17", the CPU 20 executes another "program" operation in accordance with the key-in data, such as the PLU setting, department setting or the like.

On the other hand, if it is detected that the CH-ON flag is set in STEP 3, the CPU 20 checks to see if the character code of the character pattern to be entered is stored in the character code area RA51 in the character pattern producing area RAA5 and thereafter checks to see if the input numeral data is five or less or not. In the case where this input numeral data is not larger than 5, the input numeral data is immediately stored in the column address areas RA52. On the other hand, if it is detected that the input numeral data is larger than 5, the character width is set at ten dots by the character width selecting key 11 and the input numeral data is not larger than ten, thereafter the input numeral data is stored in the column address areas RA52. Then, the DOT-ON flag in the corresponding one of the flag areas RA54 is set at "1" and this processing routine PA is finished.

Figure 8:
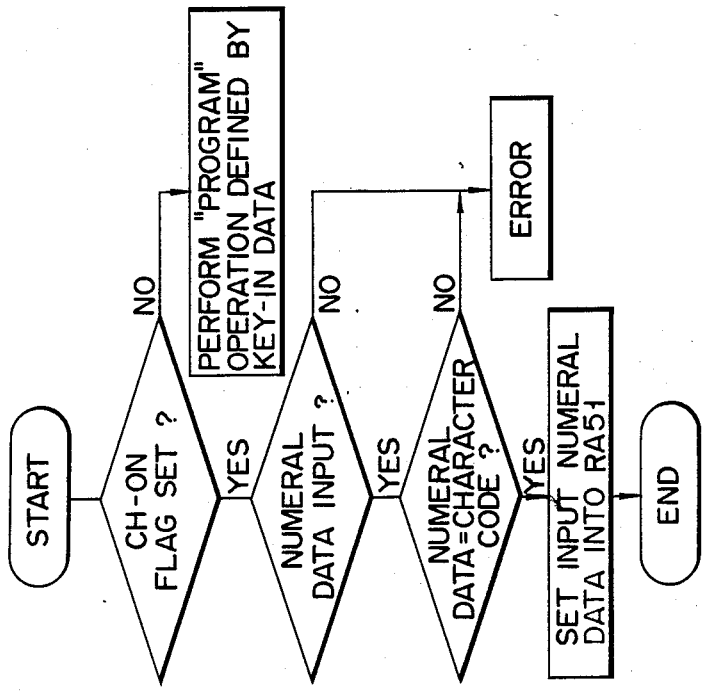

If it is detected that the operating key is not the "X" key 10-5 in STEP 2 in FIG. 6, the CPU 20 checks to see if the "NS" key 10-3 is operated or not in STEP 4. If it is detected that the "NS" key 10-3 is operated, a processing routine PB shown in FIG. 8 is executed. In this processing routine PB, when it is detected that the CH-ON flag is set into the flag area RAA4 and that the numeral data indicative of one of the character codes which are previously registered is inputted by the numeral keys 7 before the "NS" key 10-3 is operated, the CPU 20 stores the numeral data representing this character code into the character code area RA51.

Figure 9:
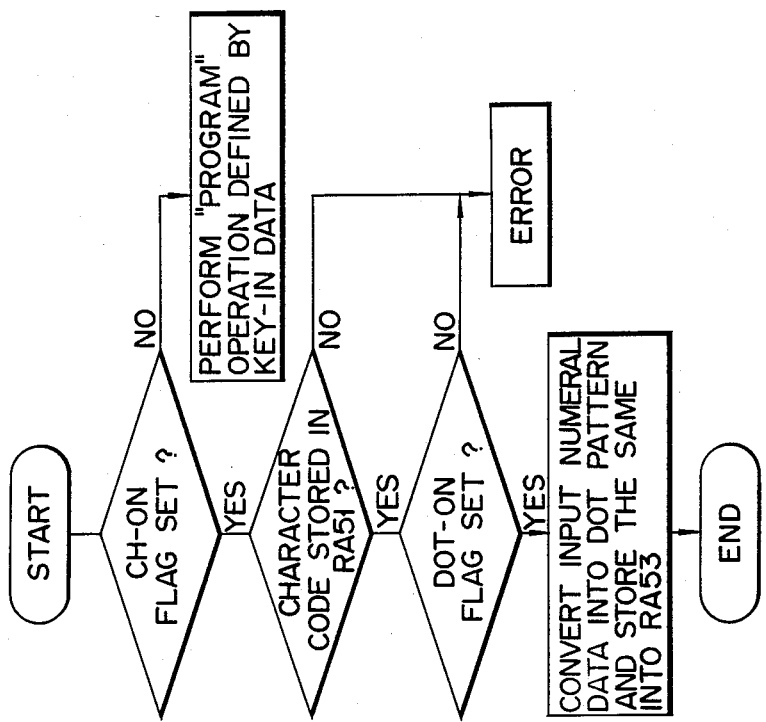

If it is detected that the operated key is not the "NS" key 10-3 in STEP 4, the CPU 20 checks to see if the "#" key 10-4 is operated or not in STEP 5. When it is detected that the "#" key 10-4 is operated, a processing routine PC shown in FIG. 9 is executed. In this processing routine PC, if it is detected that the CH—ON flag is set in the flag area RAA4 and that the character code is stored in the character code area RA51 and that the DOT-ON flag is set in one of the flag areas RA54, the CPU 20 converts the input numeral data to the hexa-code and stores this hexa-coded dot data into one of the data areas RA53 designated to one of the column addresses "1" to "10" to designate one of the flag areas RA54 in which the DOT-ON flag is set.

Figure 10:
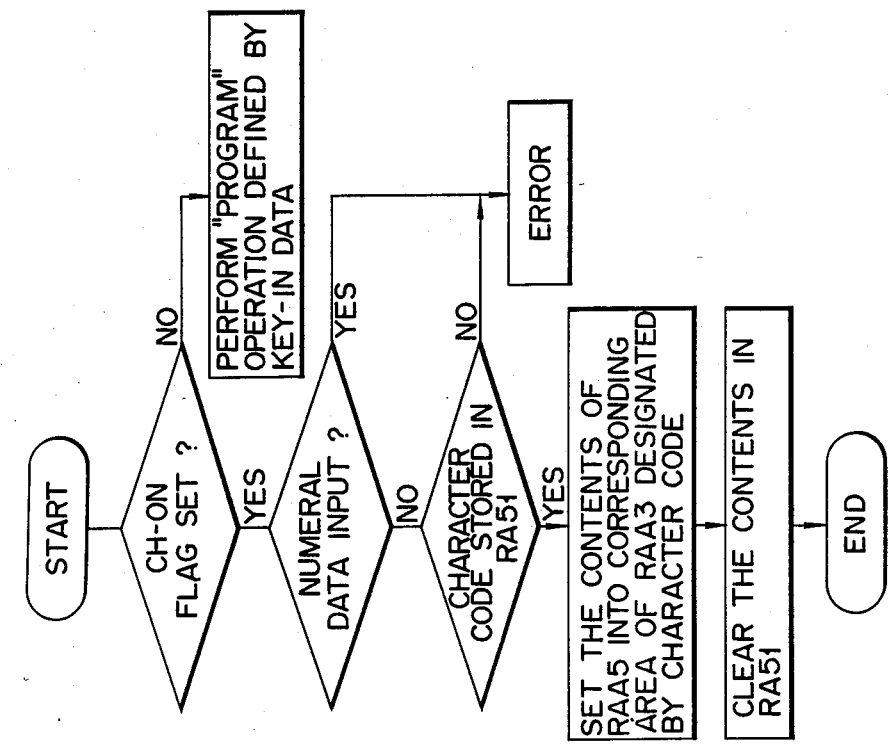

If it is detected that the operated key is not the "#" key 10-4 in STEP 5, the CPU 20 checks to see if the "ST" key 10-1 is operated or not in STEP 6. If it is detected that the "ST" key 10-1 is operated, a processing routine PD shown in FIG. 10 is executed. In this processing routine PD, if it is detected that the CH-ON flag is set and that the numeral keys 7 are not operated before the "ST" key 10-1 is operated and that the character code is set in the character code area RA51, the CPU 20 stores the character code, column address and hexa-coded dot data which are stored in the character pattern producing area RAA5 into the character dot pattern area RAA3. On the other hand, in the case where the character code of the character pattern produced in the character pattern producing area RAA5 has already been stored in the character dot pattern area RAA3, the character pattern which has been recently produced in the character pattern producing area RAA5 is stored in place of the character pattern of that character code. Thereafter, the character code in the character code area RA51 in the character pattern producing area RAA5 is cleared.

Figure 11:
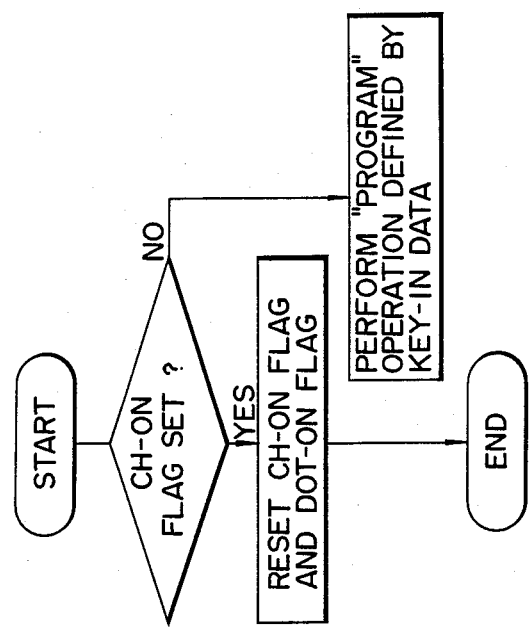

In STEP 6, if it is detected that the "ST" key 10-1 is not operated, the CPU 20 checks to see if the "AT/TL" key 10-2 is operated or not in STEP 7. When it is detected that the "AT/TL" key 10-2 is operated, a processing routine PE shown in FIG. 11 is executed. In this processing routine PE, if it is detected that the CH-ON flag is set, the CPU 20 resets the CH-ON flag and DOT-ON flag and completes the "program" operation for one character pattern.

Further, if it is detected that the "AT/TL" key 10-2 is not operated in STEP 7, a check is made to see if the numeral key is operated or not in STEP 8. If it is detected that the numeral key 7 is operated, the CPU 20 stores a numeral data responsive to the operation of this numeral key into a numeral memory area. On the other hand, if it is detected that no numeral key is operated in STEP 8, the "program" operation corresponding to the key-in data is executed.

Figure 12:
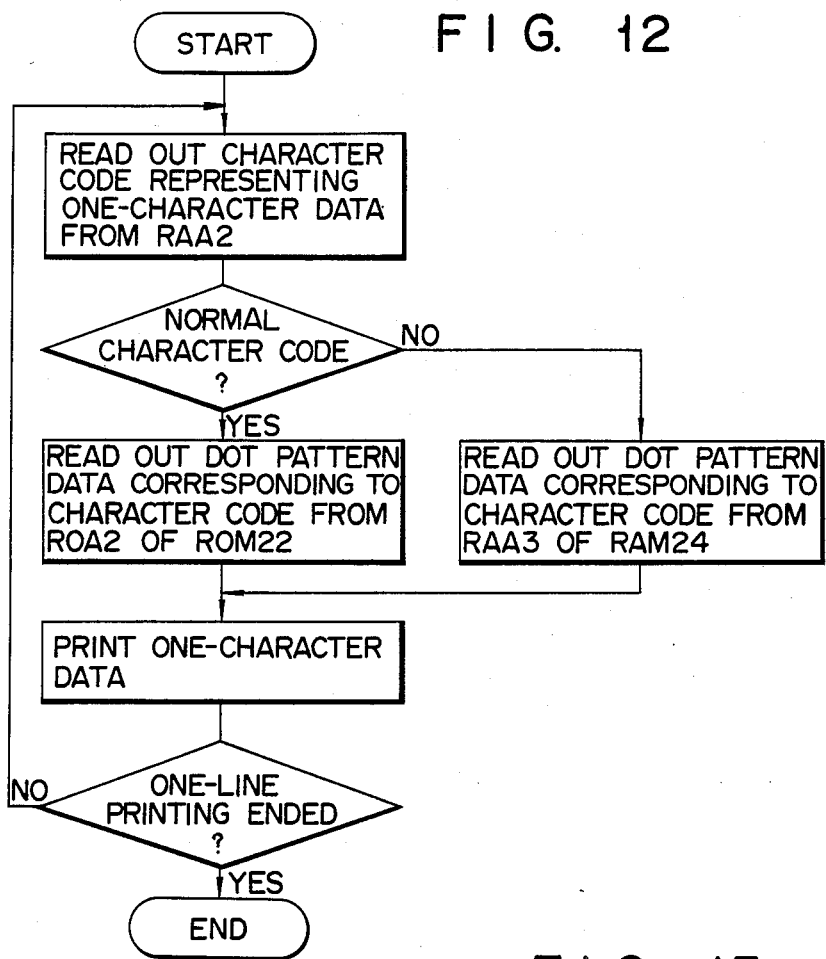
FIG. 12 is a flow chart showing the printing operation.

In the electronic cash register in which all of the character patterns of the necessary characters are set into the character dot pattern area RAA3 as described above, when the CPU 20 receives, for example, a print command from the keyboard 2 in the case where the control switch 12 is set at the "registration" mode position and the sales registrating operation is being executed, the CPU 20 executes the printing operation in accordance with a flow chart shown in FIG. 12. First, the CPU 20 reads out a character code representing one-character data from the print data buffer RAA2 in which the character codes of the characters representing one-line data to be printed on a receipt have been stored. Next, a check is made to see if this character code read out is a character code indicating an ordinary alphanumeric character or not. If it is detected that the character code representative of the ordinary alphanumeric character is read out, the character pattern data corresponding to this character code is read out from the dot pattern area RA2 in the ROM 22, thereby allowing only one character to be printed on the receipt by the dot printer 36. On the other hand, when it is detected that the character code read out from the print data buffer RAA2 is not the character code of an ordinary alphanumeric character, a character pattern data representing an italic character, extended character or the like is read out from the dot pattern area RAA3 in the RAM 24. Upon completion of the printing of one-character data in this way, the character code corresponding to the next character is read out from the print data buffer RAA2.

A procedure for setting, for example, a Grecian character of "φ" having a character code "1010" (hexa-code notation) into the dot pattern area RAA3 in the RAM 24 will now be described hereinbelow.

Figure 13:
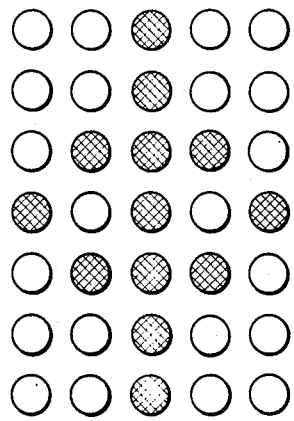
FIG. 13 shows a character pattern of a character $\phi$.

First, if it is detected that the numeral key "2" is operated when a memory clear command is generated after the power supply is turned on, the CPU 20 transfers the character pattern of the extended character stored in the ROA4 of the ROM 22 into the dot pattern area RAA3 in the RAM 24. On the other hand, if it is detected that the numeral key "1" is operated, the CPU 20 transfers the character pattern of the italic character stored in the ROA3 of the ROM 22 into the dot pattern area RAA3 of the RAM 24. Next, in order to indicate the start of the character pattern "program" operation after the control switch 12 was set at the "program" mode position, keys "1" and "7" among the numeral keys 7 are operated and a numeral data "17" is inputted. Thereafter, the "X" key 10-5 is operated. Due to this, the processing routine shown in FIG. 7 is executed. Next, the "NS" key 10-3 is operated after the numeral keys 7 were operated to input the character code "1010" to give character "φ". Thus, the processing routine shown in FIG. 8 is executed and the character code "1010" is set into the code area RA51. Next, the numeral keys 7, "X" key 10-5 and "#" key 10-4 are operated to input the dot pattern data indicative of character "φ" shown in FIG. 13 for every column. The first to fifth column addresses are inputted into the column address areas RA52 in accordance with the flow chart shown in FIG. 7 by operating the "X" key 10-5 after each of the numeral keys "1" to "5" has been operated. The dot data is inputted into the data areas RA53 in accordance with the flow chart shown in FIG. 9 by operating the numeral key or keys indicative of the corresponding bit positions and the "#" key 10-4. Namely, the following key operations are executed to input the dot pattern data representing character "φ" shown in FIG. 13. The numeral key "1", "X" key 10-5, numeral key "4", and "#" key 10-4 are operated in accordance with this sequence. Thus, the bit information "4" of the first column is inputted. The numeral key "2", "X" key 10-5, numeral keys "3" and "5", and "#" key 10-4 are operated in accordance with this sequence to enter the bit information "3" and "5" of the second column. The numeral key "3", "X" key 10-5, numeral keys "1", "2", "3", "4", "5", "6", and "7", and "#" key 10-4 are operated in accordance with this sequence to enter the bit information "1", "2", "3", "4", "5", "6", and "7" of the third column. The numeral key "4", "X" key 10-5, numeral keys "3" and "5", and "#" key 10-4 are operated in accordance with this sequence to enter the bit information "3" and "5" of the fourth column. The numeral key "5", "X" key 10-5, numeral key "4", and "#" key 10-4 are operated in accordance with this sequence to enter the bit information "4" of the fifth column. After the bit information of the respective columns "1" to "5" entered in this way was converted into the hexa-codes, the CPU 20 stores them into corresponding data areas RA53 in the RAM 24. After the hexa-codes in the columns "1" to "5" representing character "φ" are respectively stored into the five data areas RA53 in this way, the "ST" key 10-1 and "AT/TL" key 10-2 are operated, so that the dot pattern data in the memory area RAA5 is stored at the address location in the dot pattern area RAA3 that is designated by the code stored in the character code area RA51 in accordance with the flow charts shown in FIGS. 10 and 11. In this way, the character pattern "program" operation is finished.

On the other hand, if the character width is set at ten dots by the character width selecting key 11 of the keyboard 2, it is detected that the character width selecting key 11 is set at ten dots in the flow chart shown in FIG. 7, thereby enabling the character pattern of a ten-dot width to be set.

As described above, in the present invention, it is possible to manually change, for instance, a character or characters included in commercial characters, trade name or the like which are to be printed on a receipt.

Although the present invention has been described in the above with respect to one embodiment, the invention is not limited to only this embodiment. For example, in the foregoing embodiment, two dot pattern areas ROA3 and ROA4 to store a character pattern of a character which is infrequently used are provided in the ROM 22. However, in the case where there are less character patterns that should be stored, the dot pattern areas which are used may be reduced to one. Further, the contents of the dot pattern areas ROA2, ROA3 and ROA4 in the ROM 22 can be transferred to the dot pattern area RAA3 in the RAM 24.

What is claimed is:

1. An electronic cash register comprising:
   a keyboard having indicia keys including numeral keys, first to fourth function keys and department keys;
   mode setting means having a registration mode and a program mode;
   dot printing means for executing a printing operation in accordance with a received dot pattern having dots placed in lines forming a matrix of rows and columns;
   first memory means for storing a plurality of character codes to designate selected characters and storing a plurality of character patterns representing, respectively, a plurality of said selected characters, each stored character pattern being formed with said lines of dots forming a matrix of rows and columns;
   second and third memory means; and
   data processing means for, when the mode setting means is set in said registration mode, generating sales data in response to a key operation in said keyboard and storing it into said second memory means, reading out a character pattern from said first memory means in accordance with said sales data and supplying it to the dot printing means, and when the mode setting means is set in said program mode, said data processing means storing data which is generated by operating said indicia keys and said first function key into said third memory means as character code data, storing line address data which is generated by operating the indicia keys and said second function key, storing into the third memory means a character pattern which is produced by operating selected ones of the indicia keys to each of which has been assigned a unique identity corresponding to only one dot in at least one of said lines of the matrix of rows and columns, and reading out the character pattern stored in said third memory means in response to the operation of said fourth function key and storing said character pattern into a memory area in said first memory means that is designated by the character code data stored in the third memory means.

2. An electronic cash register according to claim 1, wherein said first memory means includes a first memory having first and second memory sections for storing said character patterns and character code data and a second memory, and said data processing means transfers the character patterns and character code data in said second memory section to said second memory in the initialization process.

3. An electronic cash register according to claim 2, wherein said second memory section has a plurality of memory areas, and said data processing means selectively transfers the character patterns and character code data in one of said plurality of memory areas to said second memory in the initialization process.

4. An electronic cash register according to claim 3, wherein said third memory means includes a plurality of first memory areas for storing the line address data and a plurality of second memory areas for storing the dot pattern.

5. An electronic cash register according to claim 2, wherein said third memory means includes a plurality of first memory areas for storing the line address data and a plurality of second memory areas for storing the dot pattern.

6. An electronic cash register according to claim 1, wherein said third memory means includes a plurality of first memory areas for storing the line address data and a plurality of second memory areas for storing the dot pattern.

7. An electronic cash register according to claim 1, wherein said keyboard further includes means for setting the maximum column address and said data processing means prevents column address data greater than the maximum column address data from being generated.

8. An electronic cash register according to claim 1, wherein the line address data generated by operating the indicia key and second function key comprises column address data.

9. An electronic cash register according to claim 8, wherein the indicia keys used for generating the column address data are the numeral keys.

10. An electronic cash register according to claim 9, wherein the data processing means converts the identity of each numeral key corresponding to its numeral value into a signal characteristic of a column position for a dot.

11. A method of printing dot matrix type characters comprising the steps of:
providing a keyboard having indicia keys including numeral keys, first to fourth function keys, and department keys;
storing in a first memory means a plurality of character codes to designate selected characters, and storing a plurality of character patterns representing, respectively, a plurality of said selected characters, each stored character pattern being formed of dots placed in lines forming a matrix of rows and columns;
providing second and third memory means;
setting an operating mode into one of a registration mode and a program mode;
when the printing mode is set, generating sales data in response to key operation in said keyboard and storing it into said second memory means, reading out a character pattern from said first memory means in accordance with said sales data and supplying it to a dot printing means for executing a printing operation in accordance with the character patterns read out from the first memory means; and
when the program mode is set, storing data which is generated by operating said indicia keys and said first function key into said third memory means as character code data, storing line address data which is generated by operating the indicia keys and said second function key, assigning the position of each dot in each of said lines of a matrix of rows and columns an identity corresponding to one of the indicia keys, storing into the third memory means a character pattern including identities produced by operating selected ones of the indicia keys, and reading out the character pattern stored in said third memory means in response to the operation of said fourth function key, and storing said character pattern into a memory area in said first memory means that is designated by the character code data stored in the third memory means.

12. An electronic cash register according to claim 11, wherein the line address data generated by operating the indicia key and second function key comprises column address data.

13. An electronic cash register according to claim 12, wherein the indicia keys used for generating the column address data are the numeral keys.

14. An electronic cash register according to claim 13, wherein the identity of each numeral key corresponds to its numeral value, and the data processing means converts the numeral value into a signal characteristic of a column position for a dot.

15. An electronic cash register according to claim 11, wherein the identity of each numeral key corresponds to its numeral value, and the data processing means converts the numeral value into a signal characteristic of a column position for a dot.

* * * * *